(12) United States Patent
Carroll

(10) Patent No.: US 7,051,751 B2
(45) Date of Patent: May 30, 2006

(54) BURST DISK ASSEMBLY

(75) Inventor: Kent L. Carroll, Bolingbrook, IL (US)

(73) Assignee: Pressure Spcacialist, Inc., Crystal Lake, IL (US)

( * ) Notice: Subject to any disclaimer, the term of this patent is extended or adjusted under 35 U.S.C. 154(b) by 118 days.

(21) Appl. No.: 10/729,780

(22) Filed: Dec. 5, 2003

(65) Prior Publication Data

US 2005/0121073 A1    Jun. 9, 2005

(51) Int. Cl.
*F16K 17/40* (2006.01)

(52) U.S. Cl. .............................. 137/68.23; 137/68.19; 220/89.2

(58) Field of Classification Search ............. 137/68.23, 137/68.19; 220/89.2
See application file for complete search history.

(56) References Cited

U.S. PATENT DOCUMENTS

| | | | | |
|---|---|---|---|---|
| 2,564,171 A | * | 8/1951 | Page | 220/89.2 |
| 2,582,171 A | * | 1/1952 | Simpson | 220/89.2 |
| 2,701,075 A | * | 2/1955 | Coffman | 220/89.2 |
| 2,924,354 A | * | 2/1960 | Hansen | 220/89.2 |
| 2,934,237 A | * | 4/1960 | Hansen | 220/89.2 |
| 4,590,957 A | * | 5/1986 | McFarlane | 137/68.21 |
| 4,750,510 A | * | 6/1988 | Short, III | 137/1 |
| 6,234,190 B1 | * | 5/2001 | Fischer et al. | 137/68.23 |
| 2003/0155005 A1 | * | 8/2003 | Siimes et al. | 137/68.23 |

* cited by examiner

*Primary Examiner*—Stephen M. Hepperle
*Assistant Examiner*—Craig Schneider
(74) *Attorney, Agent, or Firm*—Levenfeld Pearlstein, LLC

(57) ABSTRACT

A burst disk assembly is configured for use in a pressurized gas system for venting pressurized gas from the system in the event that the gas exceeds a predetermined pressure. A plug has a tapered cylindrical shape with a minimum cross-section that is less than a body plug region open cross-section of the assembly, and a maximum cross-section that is greater than the body plug region open cross-section. The plug defines, at an end adjacent the minimum cross-section, a disk face. A frangible disk is positioned in the plug region and is sandwiched between the plug disk face and a body radial wall of the assembly.

10 Claims, 2 Drawing Sheets

BURST DISK ASSEMBLY

BACKGROUND OF THE INVENTION

The present invention is directed to a novel burst disk. More particularly, the present invention is directed to a novel burst disk assembly that seals and secures the disk in a pressure retaining component.

Paint ball events provide the participant with an adventure in military strategy and the feel of the fear and exhilaration of battle and have become very popular. Generally participants are equipped with a gas projectile gun or rifle (which can launch a projectile without seriously harming the victim) and protective gear and are divided into two or more combat groups each with the goal of surviving the others. In a typical paintball event, participants fire projectiles, or paintballs, at one another and, when struck, are "painted" by the paint ball. The objective of such an event is to be the last person that has not been "painted" or hit with a projectile.

Typically, the projectiles used in these events are propelled using a compressed gas to avoid the potential dangers of explosives such as gun powder. Compressed gas is provided or supplied from a high-pressure source carried by the participant in a gas bottle. Although high-pressure gas is needed at the gun firing mechanism to propel the paint balls, typically the pressure in these bottles is greater than the pressure needed to safely propel the projectile within the parameters of the game. As such, it is necessary to regulate the pressure of the compressed gas provided to the gun firing mechanism to allow projectiles to be launched at a safer velocity and prevent damage to the gun. Typically, a regulator is provided, mounted to the gun or the compressed gas bottle.

Typically, pressure regulators are provided with gas at a high pressure and regulate the gas, emitting the gas at a lower pressure for use by the gun. Even though these devices are generally fairly rugged items, they do have their limitations. That is, there may be an upper pressure limit at the inlet or high pressure side and a set outlet or low pressure side.

In order to prevent overpressurizing the regulator or overpressurizing the downstream components (e.g., the paint ball gun), sacrificial elements are used to provide a vent path from the high or low pressurized region to an area of lower pressure, typically to the atmosphere. One type of sacrificial element is a burst disk. A burst disk is an element that is positioned within the pressurized region that has a failure pressure that is less than a maximum pressure for the system, but greater than a system operating pressure. Thus, if for some reason the pressure in the system exceeds the operating pressure, rather than reaching system "failure" pressure, the burst disk will fracture venting pressure from the system. The burst disk is thus a safeguard for the system components.

There are, however, no burst disk assemblies that permit readily and positively installing the assembly within a pressure regulator. Accordingly, there exists a need for a low cost, readily installable burst disk assembly that positively secures the disk within the assembly or housing. Desirably, such an assembly is configured such that the disk is more tightly held or secured to the regulator body as the assembly is secured to the regulator body.

BRIEF SUMMARY OF THE INVENTION

A burst disk assembly is configured for use in a pressurized gas system for venting pressurized gas from the system in the event that the gas exceeds a predetermined pressure. The present burst disk assembly positively secures the disk within the assembly such that the disk is more tightly held to the system component to which it is installed as the assembly is secured to the component.

The assembly includes a body having a plug region, a transition region adjacent and contiguous with the plug region and a venting region adjacent and contiguous with the intermediate region. The plug region defines an end rim and has an open cross-section. The transition region has an open cross-section that is less than the open cross-section of the plug region. The plug region and the transition region define a radial wall therebetween having a flat face. The venting region has an open cross-section that is less than the open cross-section of the intermediate region. In a present embodiment, the open regions are all coaxial and each region has a constant cross-section. The regions thus appear "stepped".

Alternately, the plug region and the intermediate region are coaxial (appear stepped) and the venting region is transverse to the plug region and the intermediate region.

A plug is fitted into the plug region of the body. The plug has a tapered cylindrical shape having a minimum cross-section that is less than the body plug region open cross-section and a maximum cross-section that is greater than the body plug region open cross-section. The plug defines a through bore having a diameter that is less than the open cross-section of the intermediate region. The plug defines, at an end adjacent the minimum cross-section, a disk face.

A frangible disk is positioned in the plug region and is sandwiched between the plug disk face and the body radial wall.

In a present assembly, the body plug region has a depth defined between the end rim and the radial wall and the plug has a length that is greater than the depth of the body plug region. The plug has a bearing face opposite the disk face, which bearing face has an arcuate profile.

To secure the assembly to a pressure retaining component (e.g., a pressure regulator), the burst disk assembly includes a thread formed on an outer surface of the body.

The tapered cylindrical shape of the plug defines an angle of taper of about 1 degree to about 5 degrees. Preferably, the angle of taper is about 2 degrees.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
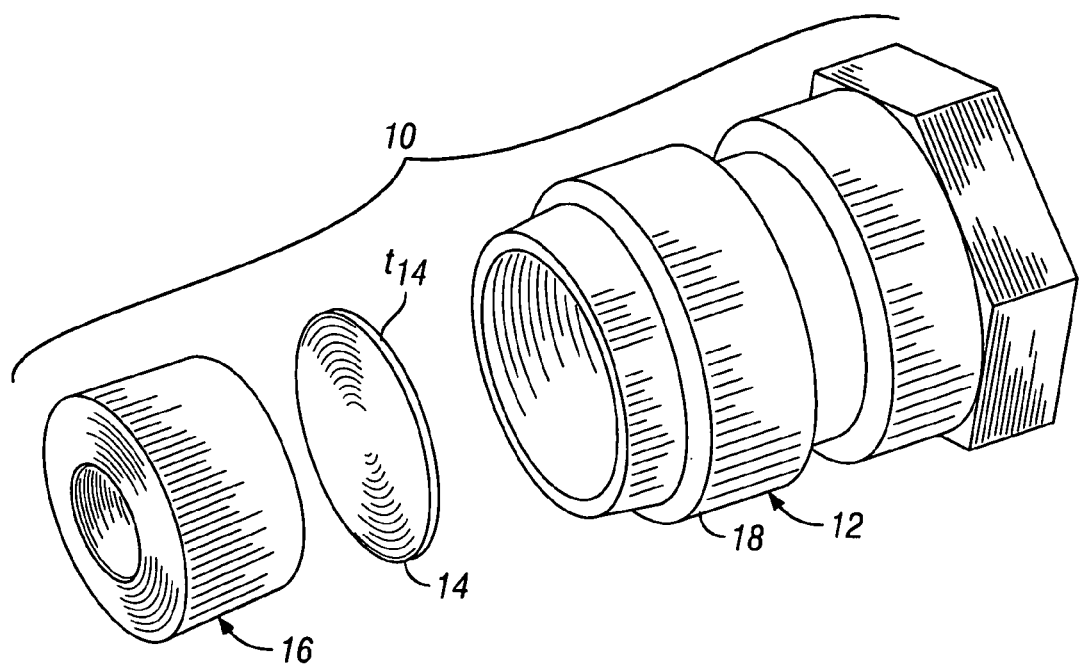
FIG. 1 is an exploded view of a burst disk assembly embodying the principles of the present invention.
Figure 2:
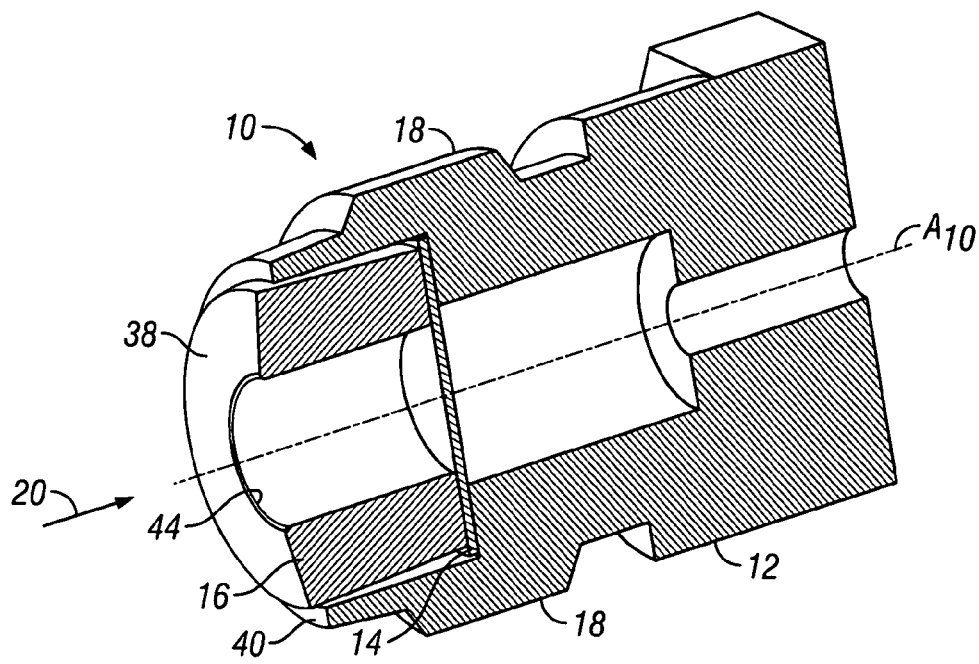
FIG. 2 is a cross-sectional view of the burst disk assembly of the FIG. 1 shown in an assembled state.
Figure 3:
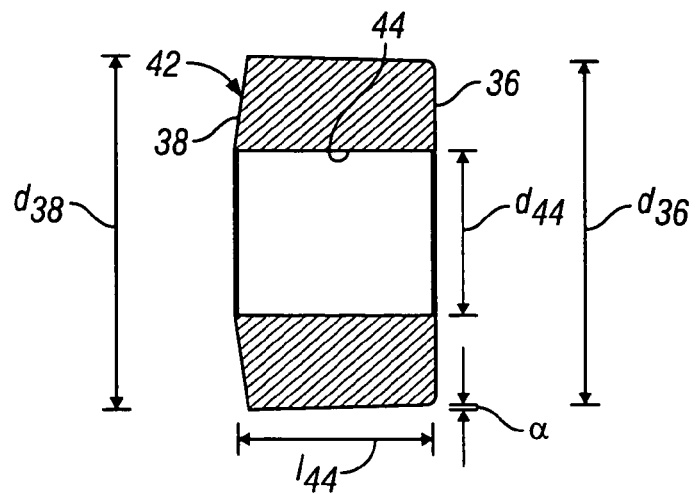
FIG. 3 is a cross-sectional view of the assembly body.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and briefly to FIG. 1 there is shown a burst disk assembly 10 embodying the principles of the present invention. The assembly 10 includes a body 12, a frangible disk 14 and a plug 16. The body 12 is formed with a fastening element, such as the exemplary thread 18 formed in the body 12. The thread 18 permits threadedly engaging the body 12 with, for example, a regulator, such as that disclosed in Carroll et al., U.S. Pat. No. 6,170,519, or other pressure retaining component. In this manner, the gas pressure is applied in the direction indicated by the arrow at 20.

The body 12 includes three distinct regions each having a predetermined diameter. A first region is the plug region 22. The plug 16 (which will be described in more detail below) is positioned in this region. The inner circular wall 24 of this region 22 is formed as a straight cylinder. That is, the cross-section or diameter $d_{22}$ remains constant along the length $l_{22}$ of this region 22. A second region is an intermediate region 26 that also has a constant cross-section or diameter $d_{26}$ that is smaller than the diameter $d_{22}$ of the plug region 22. The third region is a venting region 28 that likewise has a constant cross-section or diameter $d_{28}$, which diameter is less than the intermediate region diameter $d_{26}$.

As can be seen from the figures, the regions 22, 26, 28 are formed coaxial with one another, all lying along a common or central axis $A_{10}$ of the assembly 10. The regions 22, 26, 28 thus appear to be "stepped".

A first radial wall 30 separates the plug region 22 from the intermediate region 26, and a second radial wall 32 separates the intermediate region 26 from the venting region 28. The first radial wall 30 is straight, that is perpendicular to the inner wall 24 of the plug region 22 and the inner wall 34 of the intermediate region 26. The first and second radial walls 30, 32 essentially define the stepped profile of the body 12.

The burst disk 14 is positioned in the plug region 22 against the first radial wall 30. The burst disk 14 is a relatively thin breakable or frangible element that is sized according to the desired "burst" pressure. Those skilled in the art will recognize that the pressure at which the disk 14 ruptures is a function of the disk 14 material, the thickness $t_{14}$ of the disk 14 and the diameter $d_{26}$ of the intermediate region 26.

The plug 16 is fitted into the plug region 22 to secure the disk 14 within the body 12. The plug 16 is tapered such that it forms a snug fit within the plug region 22. The plug 16 has an inner disk facing face or disk face 36 and an outer bearing face 38. When in use, the bearing face 38 is positioned within and binds against an inner wall of the pressure retaining component (not shown). A minimum diameter portion of the plug $d_{36}$, at the disk face 36, has a diameter that is smaller than the diameter $d_{22}$ of the plug region 22. Further, the disk face 36 is flat across the cross-section or smallest diameter. Preferably, the plug 16 is longer than the plug region 22 and, as such, when the assembly 10 is assembled, the plug 16 extends beyond an end 40 of the body 12.

In a present embodiment, the plug bearing face 38 has a diameter $d_{38}$ that is larger than the plug region diameter $d_{22}$ and has a slightly arcuate or cured profile, as indicated at 42. This facilitates seating the plug 16 in the pressure retaining component (e.g., the regulator) and also provides a larger area against which pressure is applied on the plug 16 (from the pressurized region), to further enhance seating of the plug 16 in the plug region 22.

The 16 plug has a through-bore indicated at 44 having a diameter $d_{44}$ that has a constant cross-section that is smaller than the intermediate region cross-section or diameter $d_{26}$. In this manner, the plug 16 snuggly fits within the body 12 and abuts the disk 14. When the plug 16 is in position in the plug region 22, the plug through bore 44 is coaxial with the plug region 22, the intermediate region 26 and the venting region 28, lying along the assembly axis $A_{10}$.

In a present assembly, the plug region diameter $d_{22}$ is about 0.275 inches and the plug region length $l_{22}$ is about 0.140 inches; the intermediate region diameter $d_{26}$ is about 0.152 inches and the intermediate region length $l_{26}$ is about 0.210 inches; and the venting region diameter $d_{28}$ is about 0.060 inches and the venting region length $l_{28}$ is about 0.160 inches. The plug 16 has a maximum length $l_{16}$ of about 0.157 inches, a minimum diameter $d_{36}$ (at the disk face 36) of about 0.268 inches and a maximum diameter $d_{38}$ (at the binding face 38) of about 0.280 inches. The plug through-bore diameter $d_{44}$ is about 0.125 inches and the binding face 38 has a radius of curvature (as indicated at 42) of about 0.650 inches. The taper along each side of the plug can be formed at a variety of angles α, such as between about 1.0 degrees and about 5.0 degrees and is preferably formed at an angle α of about 2.2 degrees. In a present assembly, the body 12 and plug 16 are formed from brass.

As set forth above, the disk 14 is formed from a material, and has a thickness $t_{14}$ that varies depending upon the desired burst pressure. In a present assembly, the disk 14 is formed from copper and has a thickness $t_{14}$ of about 6/1000 of an inch (6 mils) for a pressure rating of about 3000 psi and a thickness of about 8 mils for a pressure rating of about 4500 psi. The disk 14 is held in place by the plug 16 compressing the disk 14 as the assembly 10 is fastened (e.g., threaded) to the body of the pressure retaining component.

Figure 4:
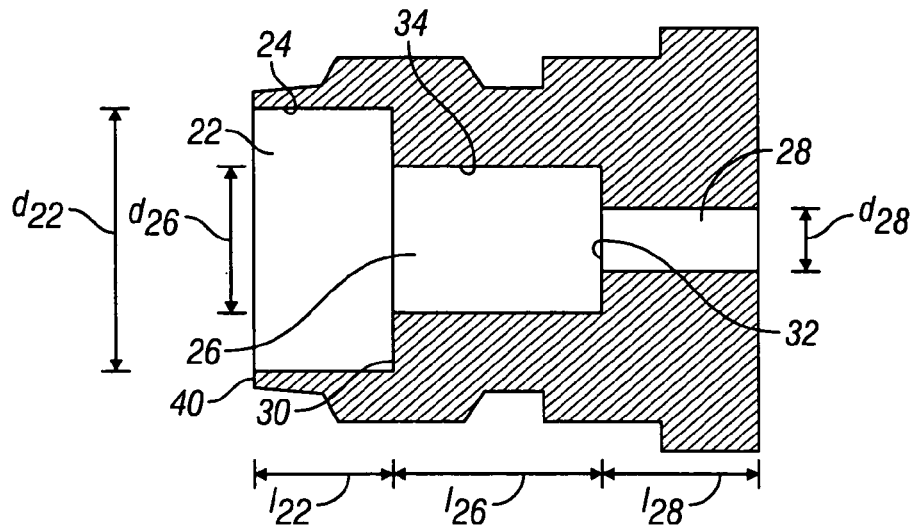
FIG. 4 is a cross-sectional view of the plug.
Figure 4B:
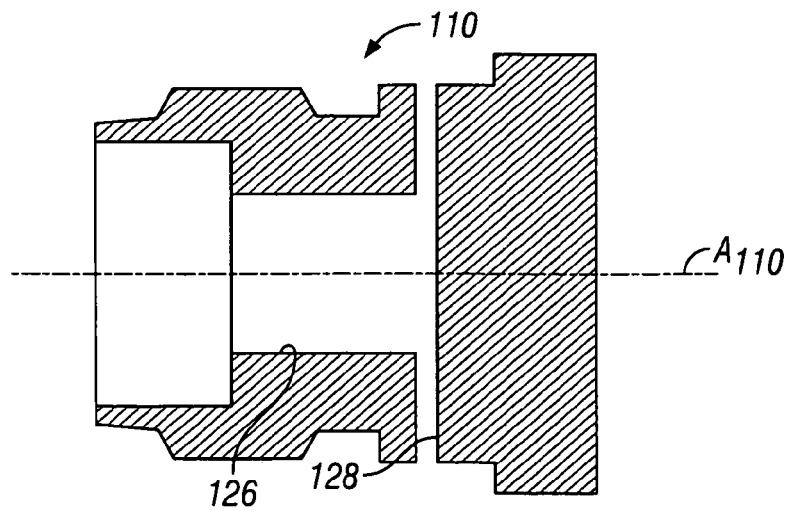
FIG. 4b is a cross-sectional view of an alternate embodiment of the burst disk assembly showing a transverse venting region.

An alternate embodiment of the burst disk assembly 110 is shown in FIG. 4b. In this embodiment, the venting region 128 is transverse to the central axis $A_{110}$ of the assembly 110. The total cross-sectional (flow) area of the transverse venting region 128 is less than the cross-sectional (flow) area of the intermediate region 126.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A burst disk assembly for use in a pressurized gas system for venting pressurized gas from the system in the event that the gas exceeds a predetermined pressure, comprising:
   a body having a plug region, an intermediate region adjacent and contiguous with the plug region and a venting region adjacent and contiguous with the intermediate region, the plug region defining an end rim and having an open cross-section of constant diameter, the intermediate region having an open cross-section that is less than the open cross-section of the plug region, the plug region and the intermediate region defining a radial wall therebetween having a flat face, the venting region have an open cross-section that is less than the open cross-section of the intermediate region;
   a plug having a tapered cylindrical shape having a minimum cross-section that is less than the body plug region open cross-section and a maximum cross-section that is greater than the body plug region open cross-section, the plug having a through bore having a diameter less than the open cross-section of the intermediate region, the plug defining, at an end adjacent the minimum cross-section, a disk face; and
   a frangible disk configured for placement in the plug region and being sandwiched between the plug disk face and the body radial wall.

2. The burst disk assembly in accordance with claim 1 where the body plug region has a depth defined between the end rim and the radial wall and wherein the plug has a length that is greater than the depth of the body plug region.

3. The burst disk assembly in accordance with claim 1 wherein the plug has a bearing face opposite the disk face and wherein the bearing face has an arcuate profile.

4. The burst disk assembly in accordance with claim 1 wherein the plug region, the intermediate region and the venting region are coaxial.

5. The burst disk assembly in accordance with claim 1 wherein the plug region and the intermediate region are coaxial.

6. The burst disk assembly in accordance with claim 5 wherein the venting region is transverse to the plug region and the intermediate region.

7. The burst disk assembly in accordance with claim 1 including a thread formed on an outer surface of the body.

8. The burst disk assembly in accordance with claim 1 wherein the plug region, the intermediate region and the venting region are each formed having a constant open cross-section.

9. The burst disk assembly in accordance with claim 1 wherein the tapered cylindrical shape of the plug defines an angle of taper of about 1 degree to about 5 degrees.

10. The burst disk assembly in accordance with claim 9 wherein the angle of taper is about 2 degrees.

\* \* \* \* \*